United States Patent [19]

Kanno

[11] 4,003,979

[45] Jan. 18, 1977

[54] METHOD OF CLEANING AIR CONTAINING CARBON MONOXIDE

[75] Inventor: Hiroshi Kanno, Amagasaki, Japan

[73] Assignee: Kanebo, Ltd., Tokyo, Japan

[22] Filed: Nov. 22, 1974

[21] Appl. No.: 526,178

[30] Foreign Application Priority Data

| | | |
|---|---|---|
| Nov. 26, 1973 | Japan | 48-132859 |
| Mar. 19, 1974 | Japan | 49-32083 |
| Apr. 24, 1974 | Japan | 49-46800 |

[52] U.S. Cl. .......... 423/239; 423/213.5; 423/213.7; 423/244; 423/247

[51] Int. Cl.[2] .......... B01D 53/34

[58] Field of Search .......... 423/212 C, 213.7, 213.5, 423/247, 244, 239, 224, 246, 245

[56] References Cited

UNITED STATES PATENTS

| | | | |
|---|---|---|---|
| 1,422,211 | 7/1922 | Lamb | 423/244 |
| 1,843,999 | 2/1932 | White | 423/212 C |
| 3,088,919 | 5/1963 | Brown et al. | 423/247 |
| 3,370,914 | 2/1968 | Gross et al. | 423/213.5 |
| 3,429,656 | 2/1969 | Taylor et al. | 423/213.7 |
| 3,443,886 | 5/1969 | Taylor et al. | 423/213.7 |

FOREIGN PATENTS OR APPLICATIONS

| | | | |
|---|---|---|---|
| 15,681 | 5/1971 | Japan | 423/247 |

*Primary Examiner*—Earl C. Thomas
*Attorney, Agent, or Firm*—Paul & Paul

[57] ABSTRACT

Polluted air containing carbon monoxide can be cleaned by passing at ambient temperature the polluted air, firstly through a filter for adsorbing materials capable of reducing at ambient temperature the oxidation activity of a noble metal catalyst and then through a catalyst layer, which is composed of the noble metal catalyst supported by active carbon and contains 20 to 50% by weight of water based on the weight of total weight of the noble metal catalyst and the active carbon.

8 Claims, 20 Drawing Figures

METHOD OF CLEANING AIR CONTAINING CARBON MONOXIDE

Figure 1:
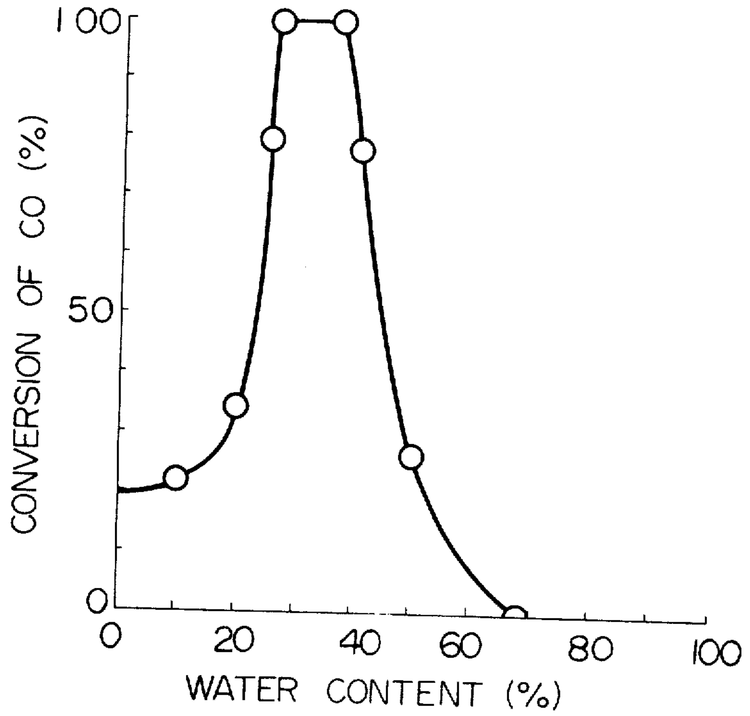

This invention relates to a method of cleaning the air polluted by a carbon monoxide gas wherein the carbon monoxide is oxidized into harmless carbon dioxide at an ambient temperature.

In recent years air pollution has become a serious problem. It is eagerly desired to remove pollutants from the air which is contaminated, for example, by the exhaust gas from internal combustion engines and contains carbon monoxide, sulfur oxides, nitrogen oxides and hydrocarbons.

Of these pollutants carbon monoxide is the most serious as it is detrimental to health. Many proposals have been made for either removing, or converting this carbon monoxide into harmless carbon dioxide, and several types of air cleaning apparatuses are already commercially available. One type of known cleaning apparatus involves the employment of a means for adsorbing pollutants in the air. However, this type is not satisfactory because of its low capacity in the adsorption of carbon monoxide. Another type involves the employment of a means for converting carbon monoxide into carbon dioxide. However, this type does not possess the capability of converting carbon monoxide into carbon dioxide at a moderate rate at an ambient temperature, although it exhibits a satisfactory capacity at an elevated temperature, e.g. approximately 100° C. This disadvantage seems to be due to the particular catalyst employed and the particular structure carrying the catalyst therewith.

Several compounds are known as a catalyst exhibiting a moderate activity for oxidizing carbon monoxide into carbon dioxide even at an ambient temperature. These include, for example, a catalyst predominantly comprised of copper oxide and manganese oxide which is well known in the art under the name "hopcalite", and a noble metal catalyst such as platinum, palladium and a platinum or palladium-containing compound. A hopcalite catalyst is not advantageous in that the catalytic activity is greatly reduced due to moisture present in the air. A noble metal catalyst such as platinum and palladium exhibits improved catalytic activity in the oxidation of carbon monoxide provided that the catalyst is supported by a carrier having a relatively large specific surface area such as alumina, silica, silicaalumina or diatomaceous earth. However, the level of catalytic activity is not sufficient at an ambient temperature, although it increases substantially at 50° C to 70° C or higher.

Japanese Patent Publication 15681/1972 discloses a palladium catalyst deposited on active carbon, which is used for oxidizing carbon monoxide at an ambient temperature. This catalyst possesses a short life span because most dusts and gases other than oxygen, nitrogen, carbon dioxide and carbon monoxide function as catalyst poison thereto. Such catalytic poisoning is particularly serious at a temperature below 50° C, although it may be almost negligible at an elevated temperature of approximately 150° C to 200° C. For example, when the above catalyst is brought into contact with an air stream at a flow rate of 150 to 1500*l*/min/*l*-catalyst composition and an ambient temperature, the catalytic activity for the oxidation of carbon monoxide is reduced to between two-thirds to one-tenth of its original activity within several tens hours. By the term "catalyst composition" used herein we mean a composition consisting essentially of a noble metal catalyst and active carbon supporting the catalyst.

Further, the activity of the above catalyst is such that when the air containing 40 ppm of carbon monoxide is passed through an air cleaning apparatus provided therewith at a flow rate of 360*l*/min/*l*-catalyst composition, only approximately 60% of the carbon monoxide can be oxidized. In other words, approximately 56*l* of the catalyst composition is necessary for processing the air at a rate of 20 $m^3$/min, which rate is usually required for a practical air cleaner, or the catalyst bed is needed to have an effective cross-sectional area of 2.2 $m^2$ for passing the air therethrough at a speed of 15 cm/sec. In order to remove approximately 80% of the carbon monoxide, approximately 74*l* of the catalyst composition should be packed in a manner such that the catalyst bed has an effective cross-sectional area of 3 $m^2$. If the effective cross-sectional area of the catalyst bed is reduced to a practical size, the pressure drop of the air inevitably increases.

It is therefore an object of the present invention to provide a method for cleaning the polluted air containing carbon monoxide wherein the oxidation of carbon monoxide is performed at ambient temperature and with an improved conversion.

Another object of the present invention is to provide an apparatus for cleaning such polluted air which possesses improved capacity and longer life span.

These objects and other objects and advantages of the invention will be apparent from the following description.

In accordance with the present invention, there is provided a method for cleaning the polluted air containing carbon monoxide wherein the carbon monoxide is oxidized into carbon dioxide, characterized in that, after the removal of materials capable of reducing at ambient temperature the oxidation activity of a noble metal catalyst from the polluted air, the air is passed at ambient temperature through a catalyst layer composed of the noble metal catalyst supported by active carbon, said catalyst layer containing 20 to 50% by weight, based on the total weight of the noble metal catalyst and the active carbon, of water.

The polluted air usually contains, besides carbon monoxide, various dusts and harmful gases. These pollutants should be removed from the polluted air before the air is brought into contact with the oxidation catalyst. Of these pollutant gases, sulfur dioxide and organic substances are particularly serious, being poisonous to the noble metal catalyst.

In order to remove sulfur dioxide and other sulfur oxides and nitrogen oxides, it is preferable to pass the polluted air through an adsorbing filter of a net- or honeycome-like structure on which is deposited a hopcalite catalyst or potassium permanganate adsorbed on active carbon, in the form of finely divided particles. This filter is advantageous in that, even when it contains the catalyst in an amount sufficient usage over several years, the pressure drop due to the catalyst is negligible.

A typical organic substance poisonous to a noble metal catalyst is the so-called oil mist which seems to be composed of various straight chain or cyclic hydrocarbons, ketones, amines and their partially oxidized products. The manner whereby such an organic substance is removed from the polluted air is not critical to the present invention. Preferably the organic substance can be removed by passing the polluted air through a filter composed of a solid adsorbent. Illustrative of the solid adsorbent employed are finely divided or fibrous active carbon, finely divided alumina, silica gel and finely divided silica-alumina. Of these, finely divided particles of active carbon, active alumina and alumina-silica are preferable. These adsorbents should preferably possess a specific surface area as large as possible, as well as micropores having an average diameter of approximately 100 angstroms, although most of the known active carbon, silica and silica-alumina adsorbents have micropores of an average diameter of approximately 40 to 60 angstroms. It is preferable to pass the polluted air through firstly a filter for adsorbing sulfur dioxide and subsequently, through an adsorbent filter for adsorbing the organic substances.

A solid organic adsorbent may also be employed instead of the solid inorganic adsorbent set forth above. Such a solid organic adsorbent includes for example porous particles of organic high polymers such as polystyrene and ion exchange resin particles and fibers.

It is possible instead of the employment of solid adsorbent to cool the polluted air to a temperature sufficient for the trapping of the organic substances. However, the inefficiency of the procedure precludes its recommendation for such purposes. It is also possible to wash the polluted air with an organic solvent. The organic solvent employed includes, for example, alcohols such as methanol and ethanol, aliphatic hydrocarbons such as hexane and cyclohexane and aromatic hydrocarbons such as benzene and toluene. However, this procedure is also disadvantageous as it necessitates recovery of the organic solvent employed.

The catalyst layer used in the invention is composed of a noble catalyst by active carbon. The noble metal used as the catalyst includes, for example, platinum, palladium, ruthenium and rhodium, and these metal-containing compounds. Of these platinum and palladium are preferable, the optimum being palladium.

The shape of active carbon used as a carrier of the noble metal catalyst is not critical. The active carbon may be in the shape of finely divided powders, particulates or fibers. However, the active carbon should possess a specific surface area of more than 500 $m^2/g$ and micropores of an average diameter of 10 to 200 angstroms. Most of the active carbons which are commercially available in the grade of catalyst carriers may be used. However, some active carbons which are prepared from coal or petroleum pitches are not preferable as they produce catalysts of relatively low catalylic activity. Fibrous active carbons, which are prepared by activating carbon fibers by treatment with steam or zinc chloride are also preferably used. These fibrous a active carbons may be employed in the form of woven or non-woven fabrics as well as fibers or filaments.

The manner whereby the noble metal catalyst is supported by the active carbon is also not critical. In general, the active carbon is dipped in a solution of the noble metal-containing compound and then, the noble metal-containing compound is reduced to pure noble metal. For example, the active carbon is dipped in an aqueous solution of palladium chloride which solution is prepared by dissolving palladium chloride in either a concentrated aqueous hydrochloric acid or an aqueous ammonia and then diluting the solution with water, or in an aqueous chloroplatinic acid. Then, the active carbon having palladium chloride or chloroplatinum acid deposited thereon is treated with hydrogen, or dipped in an aqueous formaldehyde solution and then an aqueous alkali solution such as sodium hydroxide, potassium hydroxide, sodium carbonate and potassium carbonate, whereby the deposited palladium or platinum compound is reduced into the respective pure metal.

The amount of the noble metal catalyst deposited on the active carbon may be varied ,depending upon the type, shape and surface area of active carbon but usually within the range from 0.3% to 15% by weight, preferably from 0.5% to 10% by weight, based on the total weight of the noble metal and the active carbon.

The catalyst composition of the present invention is characterized as containing a stated amount of water. The amount of water may be varied within the range from 20% to 50% by weight, preferably 25% to 40% by weight, based on the total weight of the noble metal and the active carbon. The presence of such an amount of water in the catalyst composition improves the catalyst activity for oxidizing carbon monoxide at ambient temperature and increases the life of the catalyst.

The dependency of the efficiency of the catalytic activity upon the water content in the catalyst composition is shown in FIG. 1. The abscissa signifies the water content in % by weight based on the weight of the catalyst composition, which is composed of 0.5% by weight of palladium deposited on a finely divided active carbon from coconut husk, having sizes of 10 to 20 meshes, and the ordinate signifies percentage conversion of carbon monoxide in the polluted air, as determined when the polluted air containing 30 ppm of carbon monoxide is passed through the palladium catalyst layer at a flow rate of 500*l*/min/*l*-catalyst composition. It would be seen from FIG. 1 that the catalytic activity is of a high level at the water content of approximately 20% to approximately 50% and is optimum at the water content of approximately 25% to approximately 40%. This phenomenon proved to be common to all noble metal catalysts, although the percentage conversion of carbon monoxide exhibited was highest in the case of the palladium catalyst.

The catalyst composition containing water in the amount set forth above possesses a life span far longer than the conventional catalyst composition which contains no water. For example, when said amount of water is incorporated into a catalyst composition, the activity of which would be reduced to about one third of the initial activity after approximately 1 months' operation, the catalyst exhibits an activity of greater than a half of the initial activity even after approximately 4 months' operation. It is believed that this advantage should be attributed to the fact that the water contained in the catalyst composition prevents the poisonous materials from contacting with the catalyst, even though only a trace amount of the poisonous materials is present in the air stream flowing to the catylst layer.

Figure 3A:
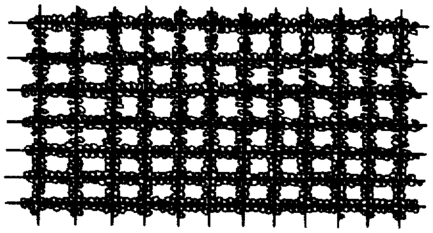
Figure 2:
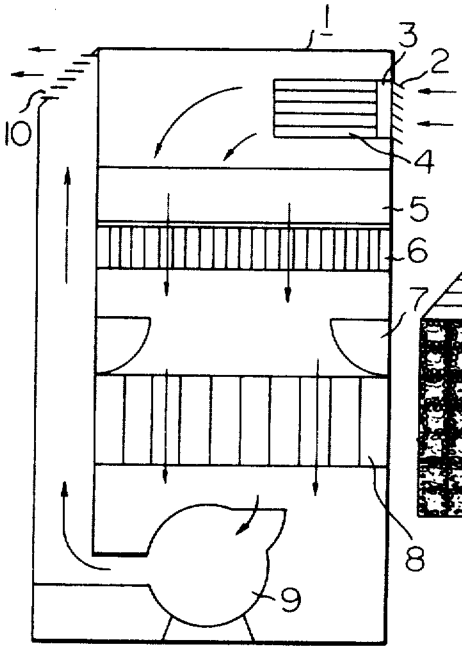
Figure 3B:
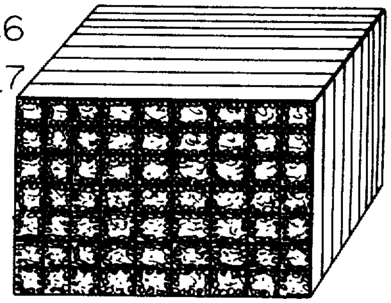
Figure 3C:
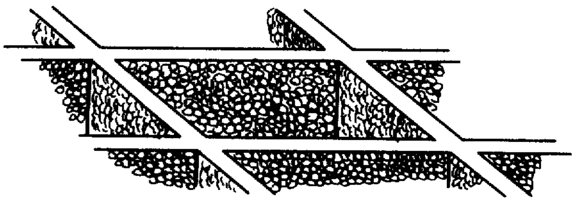
Figure 4:
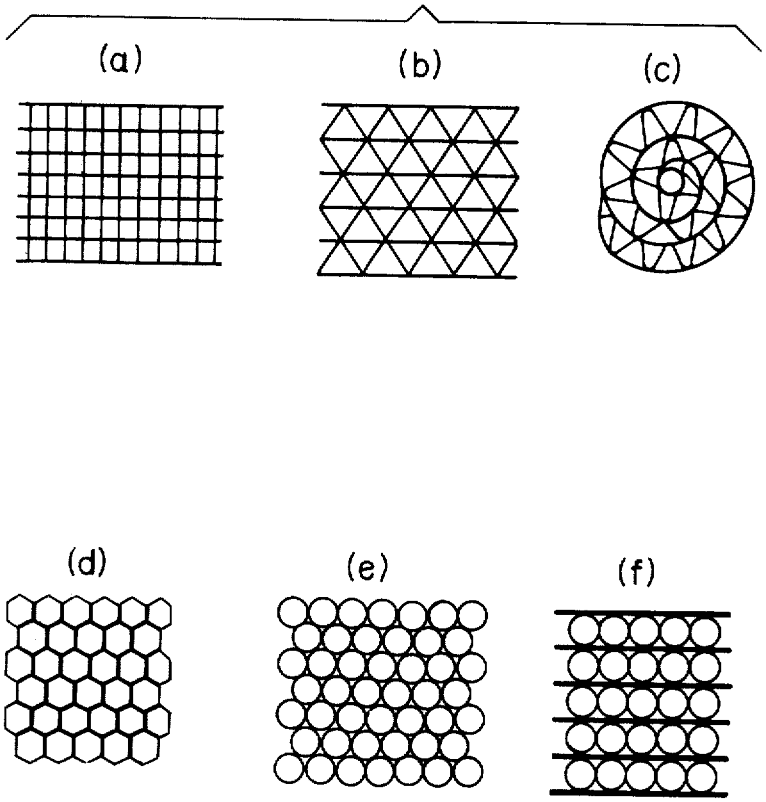
Figure 5:
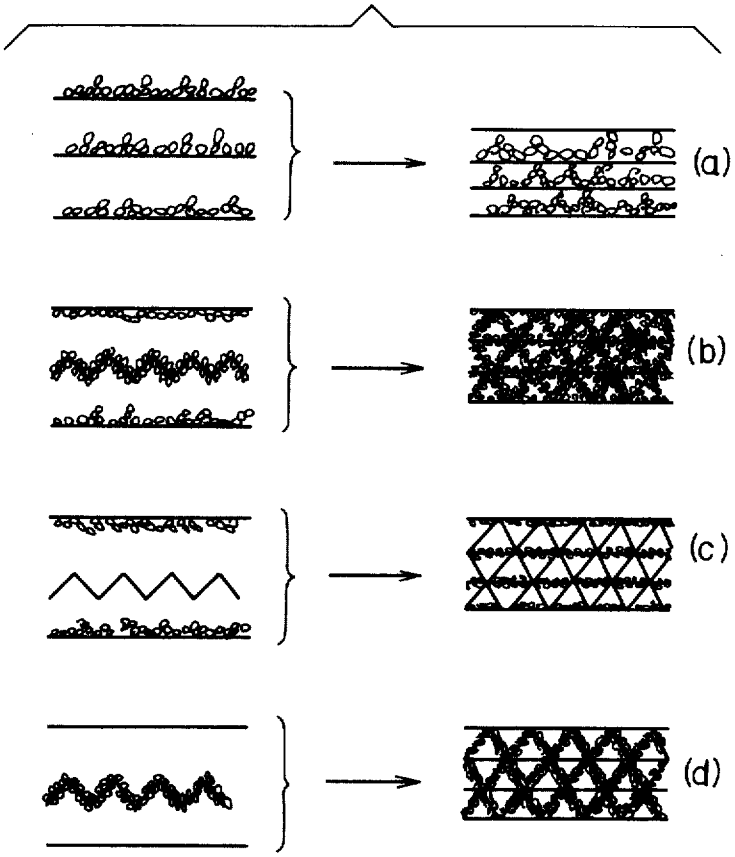
Figure 6:
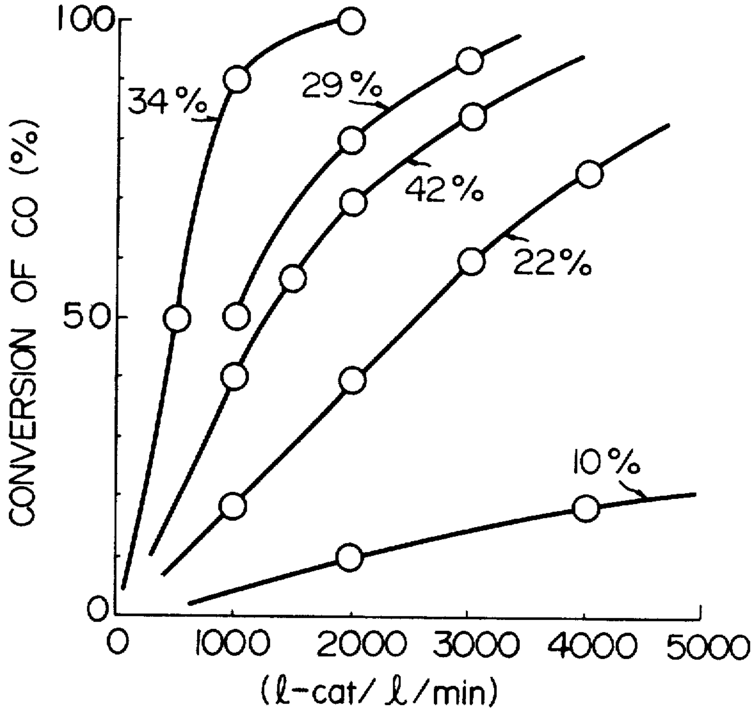
Figure 7:
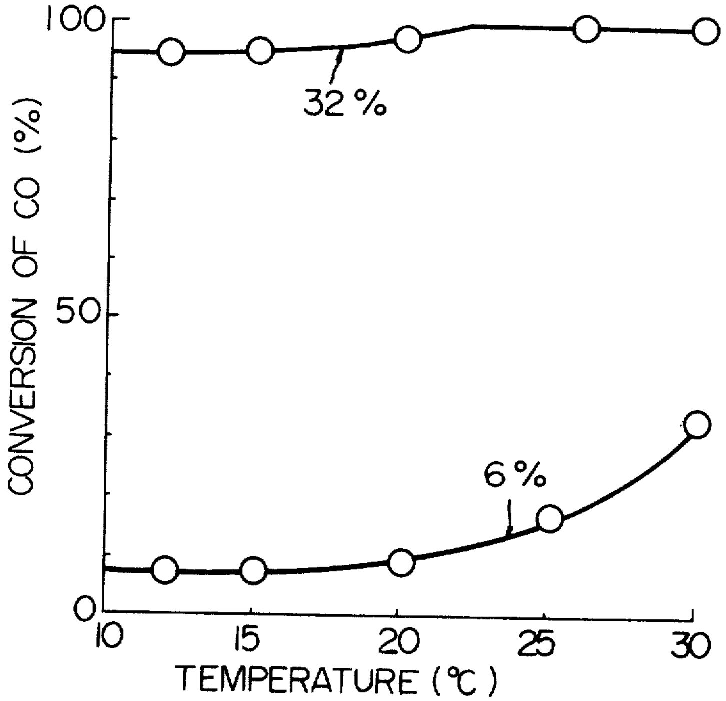
Figure 8:
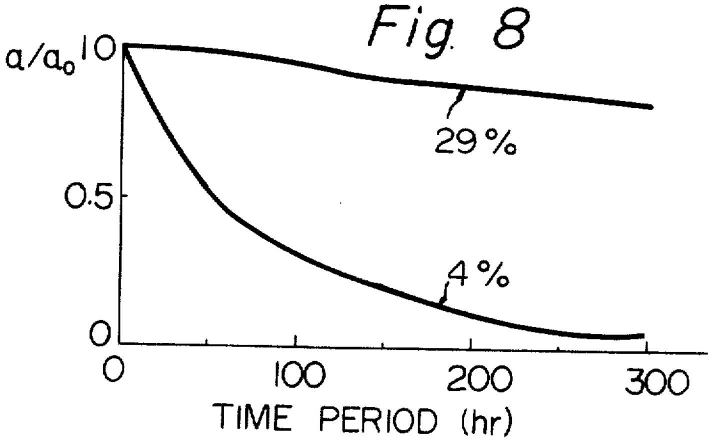
Figure 9:
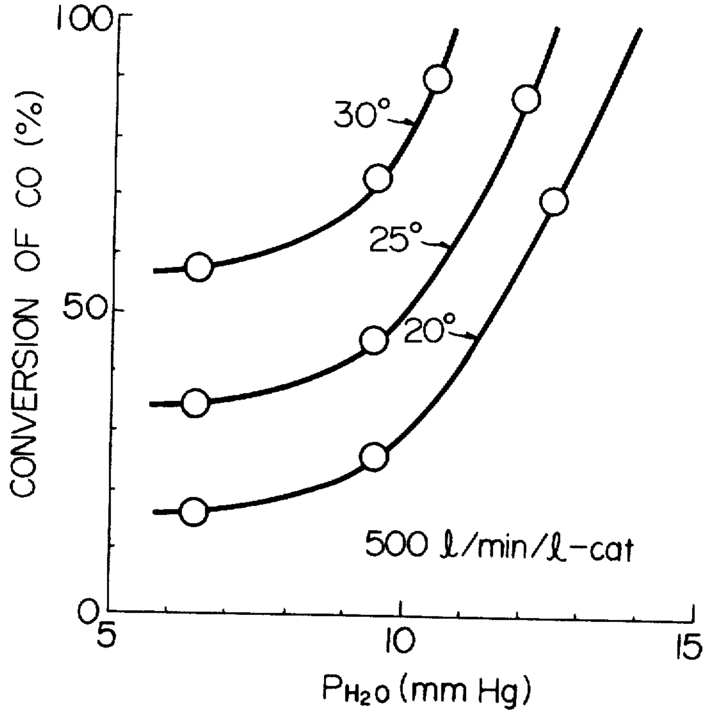
Figure 10:
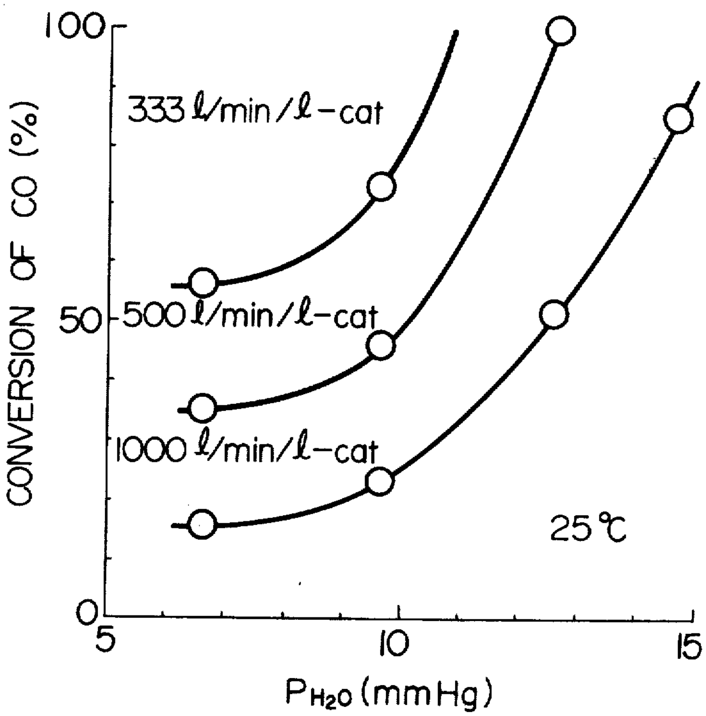

For a more detailed description of the invention reference is made to the accompanying drawings, in which:

FIG. 1 is a graph showing the influence of water content in the catalyst composition upon catalyst activity, FIG. 2 is a schematic representation of an apparatus for cleaning the polluted air, FIGS. 3A, 3B and 3C are schematic representations of net-like, piled net-like and honeycomb-like structures, respectively, FIGS. 4(*a*), (*b*), (*c*), (*d*), (*e*) and (*f*) are cross sectional views of honeycomb-like structures, FIGS. 5(*a*), (*b*), (*c*) and (*d*) are schematic representations of honeycomb-like structures, FIG. 6 comprises graphs showing the influence of water content in the catalyst composition upon the percentage conversion of carbon monoxide and the air cleaner's capacity for treating the air, FIG. 7 comprises graphs showing the influence of reaction temperature upon the percentage conversion of carbon monoxide, FIG. 8 comprises graphs showing the influence of water content in the catalyst composition upon the life span of the catalyst, FIG. 9 is a graph showing the dependency of the percentage conversion of carbon monoxide upon the partial pressure of water in the air and the reaction temperature, and FIG. 10 comprises graphs showing the dependency of the percentage conversion of carbon monoxide upon the partial pressure of water and the flow rate of the air.

Referring to FIG. 2, the polluted air is introduced into an air cleaning apparatus 1 through an inlet 2. The air passes through a first filter 3 to an electric precipitator 4 where dusts are collected from the air. The air then passes through a second filter 5 for adsorbing sulfur dioxide and a third filter 6 for removal of oil mist and other materials poisonous to a catalyst, into a catalyst layer, 8 composed of a noble metal supported by active carbon where carbon monoxide is converted into harmless carbon dioxide. Immediately upstream from the catalyst layer 8 a humidifier 7 is provided. The air so cleaned is discharged through a fan 9 and outlet 10.

The air cleaning apparatus possesses the capacity of treating the polluted air at a flow rate usually of approximately 0.1 to 50 $m^3$/min. Using this apparatus the content of carbon monoxide in the air can be reduced from the range of 10 to 200 ppm, to below 10 ppm, and in most cases to below 1 ppm. Thus, the air cleaning apparatus may be advantageously used for cleaning the indoor air in the areas polluted with carbon monoxide, for example, residences, schools and hospitals in the neighborhood of drive ways; underpasses; and the inside of a car.

In order to maintain the water content of the catalyst composition within the range of 20% to 50%, it is necessary to employ any one of the following steps. The first step involves the continuous supply of water from a reservoir through a capillary tube to the catalyst composition. The second step involves intermittent or continuous spraying of water on the catalyst composition. The third step involves humidifying the air flowing into the catalyst layer.

The humidification of the air stream in the third step may be performed by providing a humidifier immediately upstream from the catalyst layer. The type of humidifier used is not critical. Most commercially available modifiers may be employed, such as a stream humidifier, a atomizer humidifier or a vaporizer. A preferable steam humidifier is of the type such that steam, preferably steam of a pressure below 0.3 Kg/$cm^2$, is ejected from a plurality of orifices so as to be well mixed with the air. A steam humidifier is advantageous in that it does not influence the temperature of the air. The water spray humidifier is commonly of the type such that pressurized water is atomized from a nozzle or may also be of the type in which water is ejected from a nozzle by a centrifugal force. The vaporizer is usually of a dish type provided with a heater.

For practical purposes, an air cleaning apparatus should possess the capacity of treating the polluted air at a flow rate of at least 250, preferably at least 500 and more preferably at least 1,000*l*/min/*l*-catalyst composition and should exhibit a conversion of carbon monoxide of at least 50%, preferably at least 80%. Referring to FIGS. 9 and 10, wherein the dependency of the percentage conversion of carbon monoxide upon the partial pressure of water ($P_{H_2O}$) in mmHg, the temperature of air and the flow rate of the air in *l*/min/*l*-catalyst composition is shown, it will be seen that the air should contain water in an amount such that the partial pressure of water is at least 9 mmHg, preferably at least 10 mmHg, at ambient temperature, i.e., 15° C to 30° C. In other words, the air should possess a relative humidity of at least 50% or 55% at 20° C, at least 38% or 42% at 25° C and at least 25% or 30% at 30° C.

The water content of the catalyst composition greatly varies depending upon not only the relative humidity of the air to be passed therethrough but also the temperature and the flow rate of the air. The dependency of the water content upon the relative humidity, temperature and flow rate of the air is exemplified in Table I below.

Table I

| Temperature (° C) | Relative humidity (%) | Flow rate (l/min./l-catalyst composition) | Water Content (% by weight) |
|---|---|---|---|
| 30 | 40 | 1,000 | 20 |
| " | 50 | " | 29 |
| 25 | 40 | 500 | 17 |
| " | 65 | 1,000 | 28 |
| " | 70 | " | 33 |
| " | " | 500 | 40 |
| 20 | 40 | " | 12 |
| " | 70 | " | 24 |

The catalyst composition used in the present invention which is composed of a noble metal catalyst supported by active carbon, adheres onto a net-like or honeycomb-like structure.

The net-like structure may be made of any material such as metal, plastic, synthetic polymer fiber or natural fiber or any combination thereof. FIGS. 5(*a*) and 5(*b*) show examples of the net-like structure onto which the catalyst composition adheres and the net-like structure prepared by piling up a plurality of the above net-like structures, respectively. These net-like structures should possess a voidage of 20% to 90% by volume, preferably 30% to 90% by volume. The size suitable for the meshes of the net-like structure varies depending upon the particle size of active carbon employed. For example, a net-like structure of 10 to 50 meshes is preferable for active carbon of 60 to 200 meshes.

By the term "honeycomb-like structure" used herein we mean not only so-called honeycomb-like structure but also analogous structures. These should possess pores each having cross-sectional area of 1 to 25 $mm^2$, preferably 2 to 15 $mm^2$, and a voidage of 20% to 90% by volume, preferably 30% to 90% by volume. Cross-sectional shapes of pores of honeycomb-like structures may be any of circular, square, triangular, hexagonal and the like as illustrated in FIGS. 4(*a*), (*b*), (*c*), (*d*), (*e*), and (*f*). Of these hexagonal is preferable. FIG. 3(*c*) shows the state of the catalyst composition particulates adhering onto the square cross-sectional pores of a honeycomb-like structure.

Several modified honeycomb-like structures are schematically illustrated in FIGS. 5(*a*), (*b*), (*c*) and (*d*). These structures may be manufactured by piling plain or corrugated sheets onto which the catalyst composition particulartes may or may not be applied. These structures may also be used in the invention provided that they possess cores of the desired size and the desired voidage, as set forth above.

The honeycomb-like structure may be made of any material such as ceramics, glass or other similar inorganic materials, and plastics, paper, wood, woven or non-woven fabrics of synthetic polymer or natural fibers. The procedure whereby the honeycomb-like structure is manufactured is not critical. In one procedure active carbon particulates are applied onto a honeycomb-like structure, then a noble metal salt is deposited thereon and finally the deposited salt is reduced to a pure metal. This procedure is advantageous for the manufacture of the honeycomb-like structure from thermally and chemically resistant inorganic materials such as ceramics and from materials resistant to the noble metal salt solution such as plastics. In another procedure a noble metal salt is deposited on active carbon particulates and then reduced to a pure noble metal, and finally particulates of the catalyst composition so prepared are adhered onto a honeycomb-like structure.

The active carbon particulates on which the noble metal catalyst is deposited or not can be adhered onto the honeycomb-like structure by applying an adhesive on the honeycomb-like structure and then depositing the active carbon particulates thereon in anyone of the following manners; i.e., the active carbon particulates are sprinkled over the adhesive applied structure by a sand blast method, or sucked on the adhesive applied structure by applying a high voltage of 30,000 to 150,000 volt thereto, thereby generating static electricity, or the adhesive applied structure is immersed in the active carbon particulates fluidized by inert gas. Fibrous active carbons may also be adhered onto the honeycomb-like structure in a similar manner. In the case of fabrics manufactured from the fibrous active carbons, they are adhered, as they are or with the insertion of spacer, onto a sheet and the sheet is then shaped into a honeycomb-like structure.

Illustrative of adhesives used for adhering the active carbon particulates to the honeycomb-like structure on which the metal is deposited or not are epoxy resins, polyvinyl acetate, polyacrylic acid esters, synthetic rubbers, polystyrene, polyvinyl chloride, polyvinylidene chloride, polyvinyl ethers, polyvinyl acetals, urea resins, melamine resins, phenol resins, polyurethanes, unsaturated polyester resins, polyvinyl alcohol, polyacrylic acid amines, cellulose and polyphenylene oxides.

The above procedure whereby the catalyst composition particulates are adhered onto the honeycomb-like or net-like structure may also be employed for the manufacture of a filter for adsorbing poisonous organic substances or a filter having a catalyst such as hopcalite for adsorbing sulfur dioxide.

The following examples are set forth to illustrate the present invention. All percentages are by weight unless otherwise specified.

EXAMPLE 1

Commercially available, finely divided hopcalite particles of 6 to 10 mesh size were adhered to paper by using an exposy resin binder. The papers were laminated to form a filter for removing sulfur dioxide, which was of a rectangular prism shape having a 50 cm length, a 30 cm width and a 5 cm depth. The amount of hopcalite deposited on the filter was 1 kg.

3 kg of finely divided active alumina particles containing 10% of silica, of 8 to 10 mesh size and 5 kg of finely divided active carbon particles of 4 to 8 mesh size were packed into a stainless steel net vessel to form a filter for removing poisonous organic substances.

Finely divided coconut husk carbon particles having 20 to 40 mesh size and a specific surface area of 1,000 $m^2/g$ were dipped in a 0.02% palladium chloride solution in 0.1N aqueous hydrochloric acid and then in an aqueous solution containing 2% of formaldehyde and 1% of potassium carbonate. The coconut husk carbon particles so treated where then washed with water and then dried. The carbon particles had 0.5% of palladium deposited thereon. A honeycome-like structure having rectangular pores of approximately 9 $mm^2$ cross-sectional area was manufactured from paper of approximately 0.5 mm thickness. A 5% polyphenylene oxide solution in tetrachloroethylene was coated on the honeycomb-like structure, and the above palladium-deposited carbon particles were adhered thereto. The catalyst structure so prepared had an apparent voidage of 75% and an apparent cross-sectional area of approximately 240 $cm^2$ and contained 210 g of the palladium and the coconut husk carbon.

Using these filters, an air cleaning apparatus 1 as shown in FIG. 2 was constructed. An evaporator humidifier 6 equipped with a heater, having a capacity of evaporating water at a rate of 1 to 10 g/min at the flow rate of air of 2 $m^3$/min, was provided in the apparatus. A glass mat filter 3 and an electric precipitator 4 was equipped close to the inlet 2.

A gaseous mixture containing 35 ppm of carbon monoxide and having a relative humidity of 25% was prepared by blending an air with a nitrogen gas containing 0.95% of carbon monoxide. The carbon monoxide-containing gaseous mixture was passed through the air cleaning apparatus at 20° C and at a flow rate of 3 $m^3$/min. The relative humidity of the gaseous mixture was increased to approximately 60% by the evaporator humidifier, and the water content of the catalyst composition became approximately 30% be weight.

The gas extracted from the stream flowing out of the outlet 10 was tested for its carbon monoxide concentration by using a CO concentration tester APMA-10 (made by HoribaSeisakusho, Japan). The gas contained less than 1 ppm of carbon monoxide. The concentration of carbon monoxide was approximately similar even after 1000 hours' operation.

For comparison purposes, the above procedure was repeated without using the evaporation humidifier. The water content of the catalyst composition was 15% by weight. All other conditions, however remained substantially the same. The gas flowing out from the apparatus contained 13 ppm of carbon monoxide. The concentration of carbon monoxide increased to 15 to 20 ppm after 200 hours' operation.

The above procedure was further repeated without using the filter for removing poisonous organic substances. The evaporator humidifier was however used in this instance. All other conditions remained substantially the same. The concentration of carbon monoxide increased to 5 to 7 ppm after 500 hours' operation.

EXAMPLE 2.

From finely divided coconut husk carbon particles having 10 to 20 mesh size, a catalyst composition of the active carbon supporting 0.5% of palladium was prepared in a manner similar to that described in Example 1. This catalyst composition was adhered to papers, said papers being then shaped into a honeycomb-like structure. This structure had a 10 cm × 10 cm × 10 cm size and contained approximately 200 g of the catalyst composition. Twenty of the honeycomb-like structure were piled up to form a catalyst structure assembly for converting carbon monoxide. This filter assembly proved to exhibit a pressure drop of only 2 mmHg at a linear velocity of 0.3 m/sec.

Finely divided active alumina of 60 to 200 mesh size was sprinkled over a stainless steel net having 20 mesh sizes coated with an epoxy resin binder to form a filter for removing poisonous organic substances.

Using the above catalyst structure assembly and the filter for removing poisonous organic substances and a glass filter, an electric precipitator, a filter for removing sulfur dioxide and an evaporation humidifier, all similar to these used in Example 1, an air cleaning apparatus as shown in FIG. 2 was constructed.

A gaseous mixture containing approximately 30 ppm of carbon monoxide and having a humidity of 20 to 40% was prepared by blending an air with a nitrogen gas containing 0.1% of carbon monoxide. The carbon monoxide-containing gaseous mixture was passed through the air cleaning apparatus at 25° C and a flow rate of 2 $m^3$/min. The relative humidity of the gaseous mixture was increased to 60% by the evaporator humidifier. The water content of the catalyst composition was 35% by weight. The gas flowing out from the apparatus contained less than 3 ppm of carbon monoxide. The concentration of carbon monoxide remained approximately unchanged even after 800 hours' operation.

For comparison purposes, the above procedure was repeated wherein all conditions remained substantially the same, apart from the fact that the evaporator humidifier was not used. The water content of the catalyst composition was 14% by weight. The gas flowing out of the apparatus contained 20 to 27 ppm of carbon monoxide. The concentration of carbon monoxide increased to 22 to 30 ppm after 400 hours' operation.

The above procedure was repeated using the evaporator humidifier, but not the filter for removing poisonous organic substances. All other conditions remained substantially the same. The concentration of carbon monoxide in the gas flowing out of the apparatus increased to 10 to 16 ppm after 200 hours' operation.

EXAMPLE 3

This example is to illustrate the influence of the water content of the catalyst composition upon the catalytic activity for the oxidation of carbon monoxide.

Commercially available, finely divided active carbon particles from coconut husk, having 10 to 20 mesh sizes were dipped in a 0.02% palladium chloride solution in 0.1 N aqueous hydrochloric acid at 20° C for 1 hour and then in an aqueous solution containing 2% of formaldehyde and 1% of potassium carbonate at 30° C for 5 hours. The carbon particles so treated had 0.5% of palladium deposited thereon.

A gaseous mixture containing approximately 30 ppm of carbon monoxide was prepared in a manner similar to that described in Example 1. This gaseous mixture was passed at 25° C through a catalyst bed packed with the palladiumdeposited carbon particles set forth above, while ion exchanged water was supplied to the catalyst bed. Results are shown in FIG. 6 wherein the abssissa signifies a reciprocal of the flow rate (*l*/min) of the gaseous mixture per liter of the catalyst composition and the ordinate signifies the percentage conversion of carbon monoxide, and the numbers of % express the water content of the catalyst bed.

The above procedure was repeated wherein the gaseous mixture was passed through a catalyst bed of the catalyst composition containing 0.6% of palladium at 20° C and the flow rate of 500 *l*/min/*l*-catalyst. All other conditions remained substantially the same. Results are shown in FIG. 1, thereinbefore referred to.

Similarly, the dependency of the percentage conversion of carbon monoxide upon the temperature is shown in FIG. 7, wherein the numbers of % express the water content of the catalyst bed.

The above procedure was further repeated wherein a gaseous mixture containing 40 ppm of carbon monoxide was passed through the catalyst bed at a flow rate of 400 *l*/min/*l*-catalyst composition, while ion exchanged water was continuously supplied from a reservoir to the catalyst bed by capillary action of a gauze in an amount such that the water content of the catalyst bed was maintained at approximately 4% and 29%. All other conditions remained substantially the same. Results are shown in FIG. 8, wherein the abscissa signifies the period of operation and the ordinate signifies the ratio of the catalytic activity ($a$) to the initial catalytic activity ($a_1$).

EXAMPLE 4

This example is also to illustrate the influence of the water content of the catalyst composition upon the catalytic activity for the oxidation of carbon monoxide.

Coconut husk carbon particles similar to those used in Example 3 were dipped in a 0.04% aqueous chloroplatinic acid solution at 20° C for 2 hours and then in an aqueous solution containing 2% of formaldehyde and 1% of potassium carbonate at 30° C for 5 hours. The carbon particles so treated had 0.6% of platinum deposited thereon.

A gaseous mixture containing approximately 35 ppm of carbon monoxide was prepared in a manner similar to that described in Example 1. The gaseous mixture was passed at 30° C through, firstly, a scrubbing bottle filled with water and, then, a catalyst bed packed with the platinum-deposited carbon particles, set forth above, at a flow rate of 200 *l*/min/*l*-catalyst composition. Percentage conversions of carbon monoxide were as follows:

Table II

| Water content of Catalyst Composition (%) | % conversion of CO |
|---|---|
| 11 | 8 |
| 26 | 41 |
| 32 | 74 |
| 54 | 7 |

What we claim is:

1. A method for cleaning polluted air containing oxides, nitrogen oxides, organic substances and carbon monoxide wherein the carbon monoxide is oxidized into carbon dioxide, comprising the steps of:

passing the polluted air through two types of filters, one type having a layer of hopcalite or potassium permanganate deposited on active carbon for removing sulfur and nitrogen oxides and the other type being comprised of solid adsorbent selected from the group consisting of active carbon, active alumina, alumina-silica and porous particles of organic high polymers for removing organic substances and then, passing the air so treated at ambient temperature through a catalyst layer composed of a noble metal catalyst supported by the active carbon, said catalyst layer containing 20 to 50% by weight, based on the total weight of the noble metal catalyst and the active carbon, of water.

2. A method according to claim 1 wherein said catalyst layer contains 25 to 40% by weight, based on the total weight of the noble metal catalyst and the active carbon of water.

3. A method according to claim 1 wherein said catalyst layer is formed on a honeycomb-like structure.

4. A method according to claim 1 wherein said catalyst layer is formed on a net-like structure or a structure prepared by piling up said net-like structure.

5. A method according to claim 1 wherein said noble metal is palladium and present in an amount of 0.3 to 15% by weight based on the weight of the catalyst layer.

6. A method according to claim 1 wherein said water contained in the catalyst layer is supplied by humidifying the air to be passed through the catalyst layer.

7. A method according to claim 1 wherein said water contained in the catalyst layer is supplied from a reservoir by capillary action.

8. A method according to claim 1 wherein said water contained in the catalyst layer is supplied by spraying the water over the catalyst layer.

* * * * *

UNITED STATES PATENT OFFICE
CERTIFICATE OF CORRECTION

Patent No. 4,003,979 Dated January 18, 1977

Inventor(s) Hiroshi Kanno

It is certified that error appears in the above-identified patent and that said Letters Patent are hereby corrected as shown below:

In claim 1, line 2, before "oxides" (first occurrence) insert --sulphur--.

Signed and Sealed this

Fifth Day of April 1977

[SEAL]

*Attest:*

RUTH C. MASON
*Attesting Officer*

C. MARSHALL DANN
*Commissioner of Patents and Trademarks*